(12) United States Patent
Yan et al.

(10) Patent No.: US 12,220,998 B2
(45) Date of Patent: Feb. 11, 2025

(54) EUROPEAN STANDARD-BASED DOUBLE-GUN HIGH-POWER QUICK CHARGING SYSTEM AND METHOD

(71) Applicant: HIGER BUS COMPANY LIMITED, Suzhou (CN)

(72) Inventors: Guogang Yan, Suzhou (CN); Jinfeng Xiong, Suzhou (CN); Jianli Zhang, Suzhou (CN); Tao Chen, Suzhou (CN)

(73) Assignee: HIGER BUS COMPANY LIMITED, Jiangsu (CN)

( * ) Notice: Subject to any disclaimer, the term of this patent is extended or adjusted under 35 U.S.C. 154(b) by 613 days.

(21) Appl. No.: 17/621,559

(22) PCT Filed: Oct. 15, 2020

(86) PCT No.: PCT/CN2020/121178
§ 371 (c)(1),
(2) Date: Dec. 21, 2021

(87) PCT Pub. No.: WO2021/184744
PCT Pub. Date: Sep. 23, 2021

(65) Prior Publication Data
US 2022/0410736 A1      Dec. 29, 2022

(30) Foreign Application Priority Data

Mar. 20, 2020   (CN) .......................... 202010199157.7

(51) Int. Cl.
*B60L 53/16*      (2019.01)
*B60L 58/12*      (2019.01)
*H02J 7/00*       (2006.01)

(52) U.S. Cl.
CPC ............... *B60L 53/16* (2019.02); *B60L 58/12* (2019.02); *H02J 7/0029* (2013.01); *H02J 7/0049* (2020.01)

(58) Field of Classification Search
CPC ...................................................... B60L 53/14
See application file for complete search history.

(56) References Cited

FOREIGN PATENT DOCUMENTS

| | | |
|---|---|---|
| CN | 104410138 A | 3/2015 |
| CN | 104590160 A | 5/2015 |

(Continued)

*Primary Examiner* — Julian D Huffman
*Assistant Examiner* — Sadia Kousar
(74) *Attorney, Agent, or Firm* — SZDC Law PC

(57) ABSTRACT

A European standard-based double-gun high-power quick charging system and method are disclosed. The system includes a battery management system, and at least two paths composed of corresponding charging communication modules, chargers and high-voltage charging loops, each of the chargers connected to at least one charging gun; the battery management system independently controls the charging communication module and high-voltage charging loop, and performs mapping management on a control signal and high-voltage charging loop; information interaction between different charging control units and chargers is carried out independently. By designing the system compatibility and time sequence difference when a double-gun system is connected, the problem of idle chargers is solved, so that the charging speed is increased, and the problems of long-time occupation of charging resources by vehicles and low utilization efficiency of vehicles are avoided; insulation detection performed on the initial charging of vehicle battery system increases safety of the system.

9 Claims, 3 Drawing Sheets

(56) References Cited

FOREIGN PATENT DOCUMENTS

| CN | 107394292 | A |   | 11/2017 |         |
|----|-----------|---|---|---------|---------|
| CN | 107499151 | A | * | 12/2017 |         |
| CN | 107599857 | A |   | 1/2018  |         |
| CN | 108177545 | A | * | 6/2018  |         |
| CN | 108258761 | A |   | 7/2018  |         |
| CN | 108306359 | A | * | 7/2018  | ............. B60L 53/14 |
| CN | 109733249 | A |   | 5/2019  |         |
| CN | 111452639 | A |   | 7/2020  |         |
| EP | 3255718   | A1|   | 12/2017 |         |

\* cited by examiner

ND-BASED DOUBLE-GUN HIGH-POWER QUICK CHARGING SYSTEM AND METHOD

This application is the National Stage Application of PCT/CN2020/121178, filed on Oct. 15, 2020, which claims priority to Chinese Patent Application No. 202010199157.7, filed on Mar. 20, 2020, which is incorporated by reference for all purposes as if fully set forth herein.

FIELD OF THE INVENTION

The present invention belongs to the technical field of charging, and relates to a European standard-based double-gun high-power quick charging system and method.

BACKGROUND OF THE INVENTION

At present, new energy vehicles adopt European-standard DC charging in a single-gun charging mode. Currently, the new energy vehicles are gradually increasing in power, while the European-standard single-gun charging consumes a lot of time, such that the vehicles occupy charging resources for a long time and are reduced in the utilization rate, which affects the operation of the vehicles, etc. In addition, when the vehicles are equipped with a power-type power battery, the power performance of the power battery are not fully utilized, which affects the use efficiency. The European-standard charging requires that the insulation detection of the system should be completed by the charger, so the vehicles do not undergo the insulation detection during the initial charging, which poses a safety hazard. The current charging system does not support different chargers to charge the same vehicle, resulting in idleness.

CONTENTS OF THE INVENTION

The object of the present invention is to provide a European standard-based double-gun high-power quick charging system and method, which can solve the problem of low power of the European-standard single-gun charging, enable different chargers to charge the same new energy vehicle, and ensure the safety of the charging system.

The present invention adopts the following technical solution:

In the first aspect, a European standard-based double-gun high-power quick charging system is provided, comprising a battery management system, and at least two paths composed of corresponding charging communication modules, chargers and high-voltage charging loops, each of the chargers connected to at least one charging gun;

the battery management system independently controls the charging communication module and the high-voltage charging loop, and performs mapping management on a control signal and the high-voltage charging loop; and information interaction between different charging control units and chargers is carried out independently.

A further technical solution is as follows: The charging communication module includes EVCC and SECC, which are connected in a wired manner.

A further technical solution is as follows: The charger is provided with an electronic lock, which is locked when a communication signal is generated.

In the second aspect, a European standard-based double-gun high-power quick charging method is applied to the European standard-based double-gun high-power quick charging system as described in the first aspect, this method comprising the following steps:

opening a charging door to conduct a power-on self-test on a vehicle battery system, then starting a system insulation detection after the completion of the self-test, and entering a standby state;

waiting for a gun plugging-in signal, entering a charging mode when the gun plugging-in signal is detected, and interlocking for discharging;

judging whether to enter a double-gun charging mode according to the number of the detected gun plugging-in signal, then performing adhesion detection on the high-voltage charging loop, and then allowing charging if the result of the adhesion detection is normal;

determining a charging start process according to the plugging-in of the double guns;

entering a charging phase, and requesting by the vehicle battery system to stop charging when the battery is fully charged; and when the battery management system judges that the charger stops charging, it disconnects the charging loop and performs the adhesion detection on the charging loop; after the adhesion detection is completed, the vehicle battery system exits the charging mode and enters a standby mode.

A further technical solution is as follows: the "determining a charging start process according to the plugging-in of the double guns" includes the following cases:

case 1: when the double guns are plugged into the charger simultaneously, they enter the charging phase based on the sequential or simultaneous starting of the charger;

case 2: when the double guns are plugged successively into the same charger, a charging loop corresponding to the early-plugged charging gun is started first to enter the charging process and makes a request for normal charging power; then a charging loop corresponding to the later-plugged charging gun is started, and the battery management system monitors based on the charging phase of the later-started charging loop; after the later-started charging loop enters the precharging phase, the battery management system controls the early-started charging loop to request a reduction in the charging power; after the later-started charging loop completes the precharging, the double guns resume the request for normal charging power; and case 3: when the double guns are plugged into different chargers, a charger receiving the gun early is started first to enter the charging process and makes a request for normal charging power;

then a charger receiving the gun later is started, and the battery management system monitors based on the charging phase of the later-started charger;

after the later-started charger enters the precharging phase, the battery management system controls the first-started charger to request a reduction in the charging power; after the later-started charger completes the precharging, the double guns resume the request for normal charging power to the corresponding charger.

A further technical solution is as follows: case 1 includes the following processes:

when the charger starts the charging loops successively, the early-started charging loop performs handshake communication through a carrier communication signal and enters the charging phase; when the precharging phase is entered through the communication, the vehicle battery system stops the insulation detection and makes a request for precharging; when the conditions are met, normal charging begins, and another charging loop is started; when the later-started charging loop enters the precharging phase, the battery management system controls the early-started charging loop to reduce the charging power; after the later-started charging loop completes the precharging, the normal charging begins; according to the charging power allowed by the current vehicle battery system, the double guns request charging based on the maximum charging power; and when the charger starts the charging loops simultaneously, according to the system control requirements, after all the precharging process of the double-gun charging loop is completed, the vehicle battery system requests charging based on the maximum charging power.

A further technical solution is as follows: case 2 includes the following processes:

during the successive plugging-in of the double guns for charging, when a charging gun is plugged in first, the charger normally starts a charging loop first, which performs the handshake communication through the carrier communication signal and enters the charging phase; when the precharging phase is entered through the communication, the vehicle battery system stops the insulation detection and makes a request for precharging; when the conditions are met, normal charging begins; when the other charging gun is plugged in, the charger starts another charging loop, which performs the handshake communication; when the later-started charging loop enters the precharging phase, the battery management system controls the early-started charging loop to reduce the charging power; after the later-started charging loop completes the precharging, the normal charging begins; according to the charging power allowed by the current vehicle battery system, the double guns request charging based on the maximum charging power.

A further technical solution is as follows: case 3 includes the following processes:

during the plugging of the guns into different chargers for charging, a charger is normally started for charging when it receives a gun, and the handshake communication is performed through the carrier communication signal for entering the charging phase; when the precharging phase is entered through the communication, the vehicle battery system stops the insulation detection and makes a request for precharging; when the conditions are met, normal charging begins; another charger is started for charging when it receives the other gun, and the handshake communication is performed; when the later-started charger enters the precharging phase, the battery management system controls the early-started charger to reduce the charging power; after the later-started charger completes the precharging, the normal charging begins; according to the charging power allowed by the current vehicle battery system, the double guns request the corresponding charger to charge based on the maximum charging power.

A further technical solution is as follows: after the vehicle battery system exits the charging mode and enters the standby mode, the following process is further included:

in the case that the charging gun is not pulled out, the vehicle battery system controls secondary charging by selection.

A further technical solution is as follows: the method further comprises the following process:

during the insulation detection process, if there is an insulation abnormality, the charging process will be terminated and the fault will be reported.

The present invention has the following advantages:

In view of the insufficient power of the European-standard single-gun charging and the unreasonable utilization of the charging resources, with a European standard-based double-gun high-power quick charging system composed of a battery management system, a charging communication module, a charger and a high-voltage charging loop, the problem of idle chargers is solved by designing the system compatibility and time sequence difference when a double-gun system is connected, so that the charging speed is increased, and the problems of long-time occupation of charging resources by vehicles and low utilization efficiency of vehicles are avoided; in addition, insulation detection performed on the initial charging of the vehicle battery system increases the safety of the system.

BRIEF DESCRIPTION OF THE DRAWINGS

The present invention will be further described below with reference to drawings and examples.

DETAILED DESCRIPTION OF THE EMBODIMENTS

Examples

In view of the insufficient power of the European-standard single-gun charging and the unreasonable utilization of the charging resources, etc., this application provides a double-gun high-power fast charging control system, which can solve the problems of slow charging, long-time occupation of charging resources by vehicles, and low utilization efficiency of vehicles, etc.; besides, this application increases the utilization rate of the charger, and performs insulation detection on the initial charging of the system to improve the safety of the system. In the process of designing the double-gun charging scheme, this application solves the problems of compatibility and time sequence difference when the double-gun system is connected.

Figure 1:
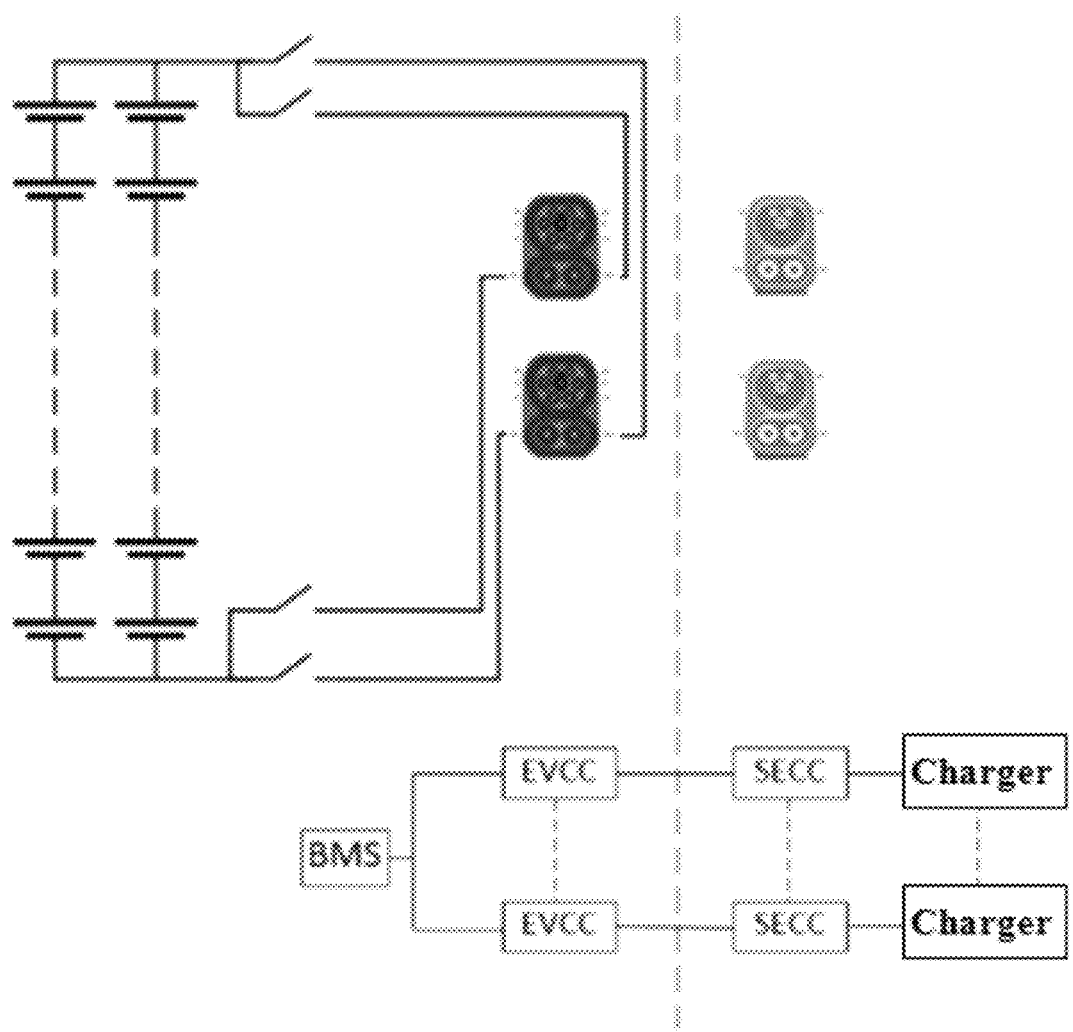
FIG. 1 is a schematic diagram of a European standard-based double-gun high-power quick charging system provided by the present application.
Figure 2:
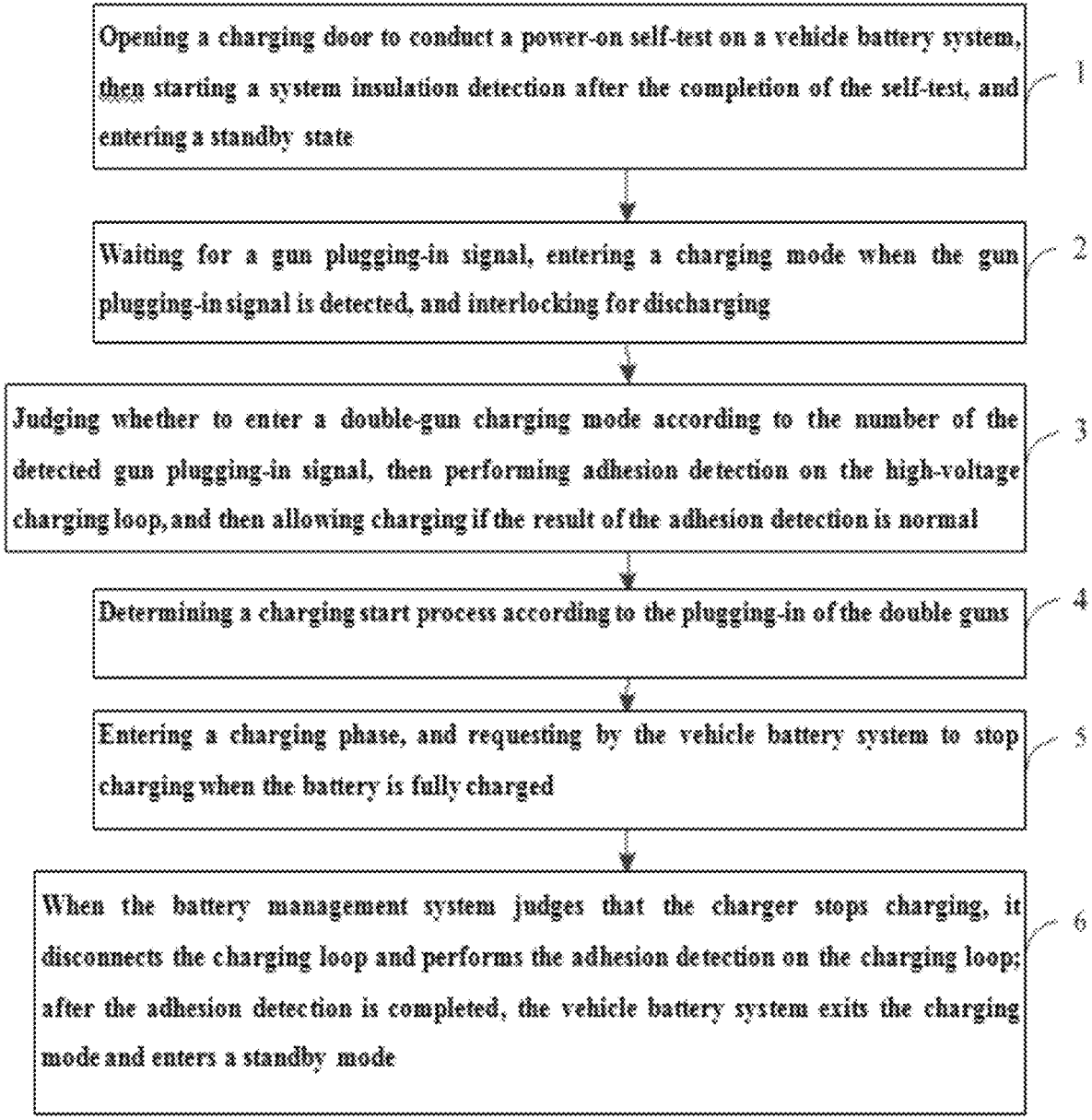
FIG. 2 is a flowchart of a European standard-based double-gun high-power quick charging method provided by the present application.
Figure 3:
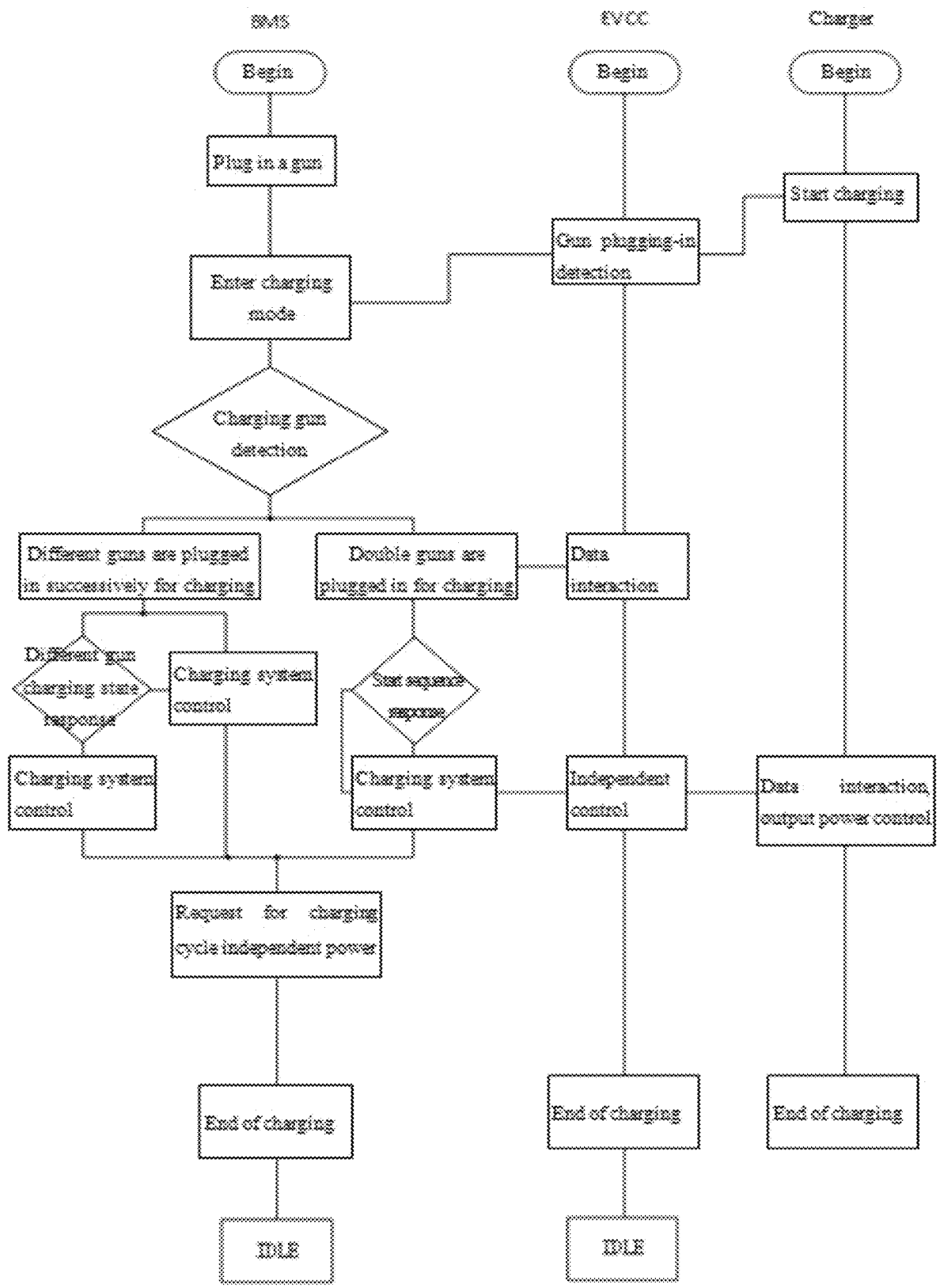
FIG. 3 is a flowchart of another European standard-based double-gun high-power quick charging method provided by the present application.

With reference to FIGS. 1 to 3, this application provides a European standard-based double-gun high-power quick charging system, which comprises a battery management system, and at least two paths composed of corresponding charging communication modules, chargers and high-voltage charging loops, each of the chargers connected to at least one charging gun; the battery management system independently controls the charging communication module and the high-voltage charging loop, and performs mapping management on a control signal and the high-voltage charging loop; and information interaction between different charging control units and chargers is carried out independently.

Optionally, as shown in FIG. 1, the charging communication module includes EVCC (Electric Vehicle Communication Controller) and SECC (Supply Equipment Communication Controller), which are connected in a wired manner. EVCC and SECC realize the function of the charging control unit.

In this application, the battery management system (BMS) independently controls the charging communication module (EVCC and SECC) and the high-voltage charging loop, and performs mapping management on a control signal and the high-voltage charging loop; information interaction between different charging control units and chargers is carried out independently, and there is no need for the charger to perform collaborative processing, enabling the same charger to charge single or double gun(s), allowing different chargers to charge the same vehicle. In practical applications, a multi-gun charging scheme can be designed according to the battery system capacity and the provided power battery.

As shown in FIG. 1, for example, the black device is a charging socket, and the gray device is a charging plug. The dotted lines between the two EVCCs, two SECCs, and two chargers respectively indicate multiple EVCCs, SECCs, and chargers connected in series, and the two paths are corresponding to each other. The dotted line between the high-voltage charging loop and the control system indicates that there is an internal processing mechanism and the system is complete.

Optionally, the charger is provided with an electronic lock, which is locked when a communication signal is generated.

The electronic lock is a hardware mechanical lock, which is locked when the data interaction is entered to prevent the wrong pulling and plugging operation of the charging gun.

This application also provides a European standard-based double-gun high-power quick charging method, which is applied to the above system. The different charging phases are explained in Table 1.

TABLE 1

| Serial number | Charging phase | Explanation |
|---|---|---|
| 1 | HAND SHAKE | Handshake phase |
| 2 | SESSION STEUP | Data interaction phase |
| 3 | CHARGE PARAM | Parameter configuration phase |
| 4 | CABLE CHECK | Insulation detection phase |
| 5 | PRECHARGE | Precharging phase |
| 6 | START CHARGE | Start charging |
| 7 | CHARGING LOOP | Charging process |
| 8 | STOP CHARGE | End charging |
| 9 | WELENDING ETECTION | Adhesion detection phase |

As shown in FIGS. 2 and 3, this method may include the following steps:
Step 1: opening a charging door to conduct a power-on self-test on the vehicle battery system, then starting a system insulation detection after the completion of the self-test, and entering a standby state.
Step 2: waiting for a gun plugging-in signal, entering a charging mode when the gun plugging-in signal is detected, and interlocking for discharging;
"interlocking for discharging" is a protection mechanism of software interlocking to prevent abnormal operation of vehicles.
Step 3: judging whether to enter a double-gun charging mode according to the number of the detected gun plugging-in signal, then performing adhesion detection on the high-voltage charging loop, and then allowing charging if the result of the adhesion detection is normal;
the adhesion detection is performed when there is a signal.
Step 4: determining a charging start process according to the plugging-in sate of the double guns;
optionally, step 4 can include the following three cases:
case 1: when the double guns are plugged into the charger simultaneously, they enter the charging phase based on the sequential or simultaneous starting of the charger;
after the double guns are plugged in simultaneously, the charger is started to charge; the double-gun charging is recognized according to the detected hardware input signal (PP signal), and the charging mode is entered according to the European-standard procedure;
case 1 can be divided into the following two possible approaches:
approach 1: when the charger starts the charging loops successively, the early-started charging loop performs handshake communication through a carrier communication signal (CP signal) and enters the charging phase; when the precharging phase (PRECHARGE) is entered through the communication, the vehicle battery system stops the insulation detection and makes a request for precharging; when the conditions are met, normal charging begins, and another charging loop is started; when the later-started charging loop enters the precharging phase, the battery management system controls the early-started charging loop to reduce the charging power; for example, the charging request current is reduced to 10 A to prevent the battery voltage from continuously rising and unsuccessful precharging of the later-started charging loop; after the later-started charging loop completes the precharging, the normal charging begins; according to the charging power allowed by the current vehicle battery system, the double guns request charging based on the maximum charging power; and
approach 2: when the charger starts the charging loops simultaneously, according to the system control requirements, after all the precharging process of the double-gun charging loop is completed, the vehicle battery system requests charging based on the maximum charging power;
case 2: when the double guns are plugged successively into the same charger, a charging loop corresponding to the early-plugged charging gun is started first to enter the charging process and makes a request for normal charging power; then a charging loop corresponding to the later-plugged charging gun is started, and the battery management system monitors based on the charging phase of the later-started charging loop; after the later-started charging loop enters the precharging phase, the battery management system controls the early-started charging loop to request a reduction in the charging power; after the later-started charging loop completes the precharging, the double guns resume the request for normal charging power;
for case 2, the specific approach is as follows: during the successive plugging-in of the double guns for charging, when a charging gun is plugged in first, the charger normally starts a charging loop first, which performs the handshake communication through the carrier communication signal (CP signal) and enters the charging phase; when the precharging phase (PRECHARGE) is entered through the communication, the vehicle battery system stops the insulation detection and makes a request for precharging; when the conditions are met, normal charging begins; when the other charging gun is plugged in, the charger starts another charging loop, which performs the handshake communication; at this time, the battery system is controlled according to the charging state of the second path; when the later-started charging loop enters the precharging phase, the battery management system controls the early-started charging loop to reduce the charging power; for example, the charging request current is reduced to 10 A to prevent the battery voltage from continuously rising and unsuccessful precharging of the later-started charging loop; after the later-started charging loop completes the precharging, the normal charging begins; according to the charging power allowed by the current vehicle battery system, the double guns request charging based on the maximum charging power;

case 3: when the double guns are plugged into different chargers, a charger receiving the gun early is started first to enter the charging process and makes a request for normal charging power; then a charger receiving the gun later is started, and the battery management system monitors based on the charging phase of the later-started charger; after the later-started charger enters the precharging phase, the battery management system controls the first-started charger to request a reduction in the charging power; after the later-started charger completes the precharging, the double guns resume the request for normal charging power to the corresponding charger;

for case 3, the specific approach is as follows: during the plugging of the guns into different chargers for charging, a charger is normally started for charging when it receives a gun, and the handshake communication is performed through the carrier communication signal (CP signal) for entering the charging phase; when the precharging phase (PRECHARGE) is entered through the communication, the vehicle battery system stops the insulation detection and makes a request for precharging; when the conditions are met, normal charging begins; another charger is started for charging when it receives the other gun, and the handshake communication is performed; when the later-started charger enters the precharging phase, the battery management system controls the early-started charger to reduce the charging power; for example, the charging request current is reduced to 10 A to prevent the battery voltage from continuously rising and unsuccessful precharging of the later-started charging loop; after the later-started charger completes the precharging, the normal charging begins; according to the charging power allowed by the current vehicle battery system, the double guns request the corresponding charger to charge based on the maximum charging power;

for different chargers, it is also necessary to reduce the power required for charging during precharging of the second path, so as to prevent the voltage from continuously rising and affecting precharging of the other path.

Step 5: entering a charging phase, and requesting by the vehicle battery system to stop charging when the battery is fully charged.

Step 6: when the battery management system judges that the charger stops charging, it disconnects the charging loop and performs the adhesion detection on the charging loop; after the adhesion detection is completed, the vehicle battery system exits the charging mode and enters a standby mode;

optionally, after the adhesion detection is completed, the electronic lock is unlocked, and the gun plugging-in state is inspected; after the charging gun is pulled out, the battery system exits the charging mode and enters the standby mode;

after the battery system exits the charging mode, in the case that the charging gun is not pulled out, the vehicle battery system controls secondary charging by selection;

it should be noted that in practical applications, during the insulation detection process, if there is an insulation abnormality, the charging process will be terminated and the fault will be reported;

in the charging state, the charging can be stopped at any time according to the actual charging needs without pulling out the gun, and can be resumed again;

this application considers the effectiveness of the system control, independently controls the charging unit, and recognizes the gun plugging-in state; the charger is started to charge, and the battery system enters the charging process;

when the guns are plugged in simultaneously, the two chargers will be started simultaneously to enter the charging phase simultaneously; when the chargers are started successively, the first-started charger will enter the charging phase first and control to request low power output, while the later-started charger will enter the precharging phase; after the precharging is completed by the later-started charger, the double guns resume the request for normal charging power;

when the guns are plugged in successively for starting, the first-started charger will enter the charging process and make a request for normal charging power; then a charger receiving the gun later is started, and the system monitors based on the charging phase of the later-started charger; when the later-started charger enters the precharging phase, the system controls the first-started charger to request low power output; after the precharging is completed by the later-started charger, the double guns resume the request for normal charging power;

after the normal charging is completed or the charging is stopped manually, the battery system exits the charging mode and enters the standby mode; the secondary charging can be selected without pulling the gun;

in the charging mode, when the system controls the independent charging unit, the system detects the charging signal for simultaneous plugging-in of the guns, sequential plugging-in of the guns, simultaneous starting, and sequential starting; the charging unit is independently controlled, and can respond at any time in any charging phase to enter high-power charging.

Using the European standard-based double-gun high-power quick charging system and method provided in this application, under the condition that the battery capacity is sufficient or the battery charging rate allows, the requirements for the dual-gun and multi-gun European-standard charging can be met, the problem of high-power charging can be solved, the charging efficiency can be improved, the charging time can be reduced by half, and the problems of long-time occupation of charging resources by new energy vehicles and idle charging resources can be solved.

In the European standard-based double-gun high-power quick charging system and method provided in this application, the low-level signals of the charging control unit are required to be co-grounded to improve the signal reliability, different control units are required to be in one-to-one correspondence with the charging sockets, and the output voltage of the charger in the precharging process should be higher than the target voltage to prevent current backflow.

The same charger can start the double guns simultaneously or successively during the output charging process of the double guns; if the double guns are started successively, when the later-started gun enters the charging process, the charger can actively set the early-started gun to stop or reduce the output to ensure the precharging stability of the later-started gun.

When the charger actively stops charging in the charging process, it can be set to get the gun pulled out and then plugged in again for charging, so as to ensure the safety and reliability of the high-voltage charging loop.

In summary, with the European standard-based double-gun high-power quick charging system and method provided in this application, in view of the insufficient power of the European-standard single-gun charging and the unreasonable utilization of the charging resources, the problem of idle chargers is solved through the European standard-based double-gun high-power quick charging system composed of a battery management system, a charging communication module, a charger and a high-voltage charging loop by designing the system compatibility and time sequence difference when a double-gun system is connected, so that the charging speed is increased, and the problems of long-time occupation of charging resources by vehicles and low utilization efficiency of vehicles are avoided; in addition, insulation detection performed on the initial charging of the vehicle battery system increases the safety of the system.

The terms "first" and "second" are only used for descriptive purposes, and cannot be understood as indicating or implying relative importance or implying the number of indicated technical features. Thus, the defined "first" and "second" features may explicitly or implicitly include one or more of these features. In the description of this application, "plurality" or "multiple" means two or more, unless otherwise specified.

The serial numbers of the above-mentioned examples of this application are for description only, and do not imply the priority of the examples.

The above are only preferred examples of this application, and are not intended to limit this application; any modification, equivalent replacement, improvement, etc. made within the spirit and principle of this application shall be included in the protection scope of this application.

The invention claimed is:

1. A European standard-based double-gun high-power quick charging system, characterized in that: the system comprises a battery management system, and at least two paths composed of corresponding charging communication modules, chargers and high-voltage charging loops, each of the chargers connected to at least one charging gun;
the battery management system independently controls the charging communication module and the high-voltage charging loop, and performs mapping management on a control signal and the high-voltage charging loop; and
information interaction between different charging control units and chargers is carried out independently,
wherein the charging communication modules are adapted for determining a charging start process according to the plugging-in of the charging guns, the charging start process includes the following cases:
case 1: when the charging guns are plugged into the charger simultaneously, they enter the charging phase based on the sequential or simultaneous starting of the charger;
case 2: when the charging guns are plugged successively into the same charger, a charging loop corresponding to the early-plugged charging gun is started first to enter the charging process and makes a request for normal charging power; then a charging loop corresponding to the later-plugged charging gun is started, and the battery management system monitors based on the charging phase of the later-started charging loop; after the later-started charging loop enters a precharging phase, the battery management system controls the early-started charging loop to request a reduction in the charging power; after the later-started charging loop completes the precharging, the charging guns resume the request for normal charging power; and
case 3: when the charging guns are plugged into different chargers, a charger receiving the gun early is started first to enter the charging process and makes a request for normal charging power; then a charger receiving the gun later is started, and the battery management system monitors based on the charging phase of the later-started charger; after the later-started charger enters the precharging phase, the battery management system controls the first-started charger to request a reduction in the charging power; after the later-started charger completes the precharging, the charging guns resume the request for normal charging power to the corresponding charger.

2. The European standard-based double-gun high-power quick charging system according to claim 1, characterized in that: the charging communication module includes Electric Vehicle Communication Controller (EVCC) and Supply Equipment Communication Controller (SECC), which are connected in a wired manner.

3. The European standard-based double-gun high-power quick charging system according to claim 1, characterized in that: the charger is provided with an electronic lock, which is locked when a communication signal is generated.

4. A European standard-based double-gun high-power quick charging method, characterized in that: this method is applied to the European standard-based double-gun high-power quick charging system according to claim 1, comprising the following steps:
opening a charging door to conduct a power-on self-test on a vehicle battery system, then starting a system insulation detection after the completion of the self-test, and entering a standby state;
waiting for a gun plugging-in signal, entering a charging mode when the gun plugging-in signal is detected, and interlocking for discharging;
judging whether to enter a double-gun charging mode according to the number of the detected gun plugging-in signal, then performing adhesion detection on the high-voltage charging loop, and then allowing charging if the result of the adhesion detection is normal;
determining a charging start process according to the plugging-in of the double guns;
entering a charging phase, and requesting by the vehicle battery system to stop charging when the battery is fully charged; and
when the battery management system judges that the charger stops charging, it disconnects the charging loop and performs the adhesion detection on the charging loop; after the adhesion detection is completed, the vehicle battery system exits the charging mode and enters a standby mode, wherein the "determining a charging start process according to the plugging-in of the double guns" includes the following cases:

case 1: when the double guns are plugged into the charger simultaneously, they enter the charging phase based on the sequential or simultaneous starting of the charger;

case 2: when the double guns are plugged successively into the same charger, a charging loop corresponding to the early-plugged charging gun is started first to enter the charging process and makes a request for normal charging power; then a charging loop corresponding to the later-plugged charging gun is started, and the battery management system monitors based on the charging phase of the later-started charging loop; after the later-started charging loop enters a precharging phase, the battery management system controls the early-started charging loop to request a reduction in the charging power; after the later-started charging loop completes the precharging, the double guns resume the request for normal charging power; and case 3: when the double guns are plugged into different chargers, a charger receiving the gun early is started first to enter the charging process and makes a request for normal charging power; then a charger receiving the gun later is started, and the battery management system monitors based on the charging phase of the later-started charger; after the later-started charger enters the precharging phase, the battery management system controls the first-started charger to request a reduction in the charging power; after the later-started charger completes the precharging, the double guns resume the request for normal charging power to the corresponding charger.

5. The European standard-based double-gun high-power quick charging method according to claim 4, characterized in that case 1 includes the following processes:

when the charger starts the charging loops successively, the early-started charging loop performs handshake communication through a carrier communication signal and enters the charging phase; when the precharging phase is entered through the communication, the vehicle battery system stops the insulation detection and makes a request for precharging; when the conditions are met, normal charging begins, and another charging loop is started; when the later-started charging loop enters the precharging phase, the battery management system controls the early-started charging loop to reduce the charging power; after the later-started charging loop completes the precharging, the normal charging begins; according to the charging power allowed by the current vehicle battery system, the double guns request charging based on the maximum charging power; and when the charger starts the charging loops simultaneously, according to the system control requirements, after all the precharging process of the double-gun charging loop is completed, the vehicle battery system requests charging based on the maximum charging power.

6. The European standard-based double-gun high-power quick charging method according to claim 4, characterized in that case 2 includes the following processes:

during the successive plugging-in of the double guns for charging, when a charging gun is plugged in first, the charger normally starts a charging loop first, which performs the handshake communication through the carrier communication signal and enters the charging phase; when the precharging phase is entered through the communication, the vehicle battery system stops the insulation detection and makes a request for precharging; when the conditions are met, normal charging begins; when the other charging gun is plugged in, the charger starts another charging loop, which performs the handshake communication; when the later-started charging loop enters the precharging phase, the battery management system controls the early-started charging loop to reduce the charging power; after the later-started charging loop completes the precharging, the normal charging begins; according to the charging power allowed by the current vehicle battery system, the double guns request charging based on the maximum charging power.

7. The European standard-based double-gun high-power quick charging method according to claim 4, characterized in that case 3 includes the following processes:

during the plugging of the guns into different chargers for charging, a charger is normally started for charging when it receives a gun, and the handshake communication is performed through the carrier communication signal for entering the charging phase; when the precharging phase is entered through the communication, the vehicle battery system stops the insulation detection and makes a request for precharging; when the conditions are met, normal charging begins; another charger is started for charging when it receives the other gun, and the handshake communication is performed; when the later-started charger enters the precharging phase, the battery management system controls the early-started charger to reduce the charging power; after the later-started charger completes the precharging, the normal charging begins; according to the charging power allowed by the current vehicle battery system, the double guns request the corresponding charger to charge based on the maximum charging power.

8. The European standard-based double-gun high-power quick charging method according to claim 4, characterized in that: after the vehicle battery system exits the charging mode and enters the standby mode, the following process is further included:

in the case that the charging gun is not pulled out, the vehicle battery system controls secondary charging by selection.

9. The European standard-based double-gun high-power quick charging method according to claim 4, characterized in that the method further comprises the following process:

during the insulation detection process, if there is an insulation abnormality, the charging process will be terminated and the fault will be reported.

* * * * *